United States Patent [19]

Davy et al.

[11] 4,206,348
[45] Jun. 3, 1980

[54] OPTICAL SCANNER WITH ELECTROOPTICAL FEEDBACK FOR BEAM POSITIONING

[75] Inventors: Lee N. Davy; James E. Harvey, both of Rochester, N.Y.

[73] Assignee: Eastman Kodak Company, Rochester, N.Y.

[21] Appl. No.: 912,631

[22] Filed: Jun. 5, 1978

[51] Int. Cl.² .................................................. G01J 1/20
[52] U.S. Cl. ..................................... 250/201; 250/235
[58] Field of Search ............... 250/235, 234, 236, 201; 358/132, 302

[56] References Cited

U.S. PATENT DOCUMENTS

| | | |
|---|---|---|
| 2,540,016 | 1/1951 | Sunstein . |
| 2,630,548 | 3/1953 | Muller . |
| 2,634,325 | 4/1953 | Bond et al. . |
| 2,657,257 | 10/1953 | Lesti . |
| 2,816,246 | 12/1957 | Bliss . |
| 3,033,073 | 5/1962 | Shuttleworth . |
| 3,536,950 | 10/1970 | Johnston et al. . |
| 3,809,806 | 5/1974 | Walker et al. ..................... 358/132 |

*Primary Examiner*—David C. Nelms
*Assistant Examiner*—Darwin R. Hostetter
*Attorney, Agent, or Firm*—Warren W. Kurz

[57] ABSTRACT

Apparatus for use in an optical scanner for accurately controlling, from scan to scan, the position in which the horizontal scan line is formed. A closed electrooptical feedback loop is employed to sense, prior to the formation of each horizontal scan line, the vertical position of the scanning light beam in the plane of the recording element and, in the event its position is displaced from a nominal position, to produce an error signal to move the beam to the nominal position.

6 Claims, 2 Drawing Figures

OPTICAL SCANNER WITH ELECTROOPTICAL FEEDBACK FOR BEAM POSITIONING

BACKGROUND OF THE INVENTION

This invention relates to optical scanners of the type in which a beam of light is repetitively scanned across a moving photosensitive recording element to record video information thereon. More particularly, this invention relates to improvements in apparatus for accurately positioning the light beam prior to each scanning movement thereof.

For many years now, optical scanners have been used to record video information on photosensitive recording elements. Such scanners typically employ a light-deflecting device (e.g. a rotating polygonal mirror, an oscillating galvanometer mirror, an acoustooptic cell, etc.) to repetitively scan a light beam across a photosensitive surface while the beam is intensity-modulated with video information. Each scanning movement of the beam produces upon the recording element a linear scan line which, in conventional notation, extends in the X (i.e. horizontal) direction. To space the scan lines and thereby effect two-dimensional imaging, it is common to advance the recording element in the Y (i.e. vertical) direction while the horizontal scan lines are produced. By advancing the recording element at a constant rate, a uniform scan line spacing can be achieved. This assumes, of course, that the deflection device is capable of scanning the beam in the same horizontal position, scan after scan after scan. For high quality imaging, it has been found that the scan line position must be controlled to within a few seconds of arc, from scan to scan.

The deflection device most commonly used in high speed optical scanners is the rotating polygonal mirror. To achieve the scanning accuracy mentioned above, it is, of course, necessary that this mirror be fabricated with an exceptional degree of accuracy. Not only must the individual reflective facets be smooth, flat and identical in size, but also the angular relationship between the plane of each individual facet and the axis of rotation of the mirror, must be virtually identical, from facet to facet. Small angular deviations can give rise to noticeable variations in scan line spacing which recur with each revolution of the mirror. As one would except, polygonal mirrors which are capable of repetitively scanning light beams with the aforementioned accuracy are very difficult and costly to manufacture.

To avoid the high costs associated with the manufacture of high quality polygonal mirrors, considerable effort has been expended heretofore in devising schemes for compensating for the angular defects inherent in low-cost mirrors. Such schemes accept the fact that most of the reflective facets of a low-cost polygonal mirror will produce a scan line which is somewhat displaced from a nominal position, and suggest apparatus for adjusting the system components to bring the scan line and the nominal position into coincidence. One such apparatus is disclosed in an article by Helmberger et al, entitled "Correction of Axial Deflection Errors in Rotating Mirror Systems," Optics and Laser Technology, December 1975. Such apparatus utilizes a preprogrammed acoustooptic cell to control the angle of incidence between a light beam and the facets of a rotating polygonal mirror. By controlling this angle of incidence, the cell controls the plane in which the reflected beams scans the recording element and, hence the line spacing. As each mirror facet is rotated into a position to scan the light beam, an error signal, proportional to the angular defects to such mirror facet (as determined by a precalibration procedure) is applied to the acoustooptic cell to adjust the angle at which the light beam strikes the facet. In this manner, the beams reflected by the mirror facets can be made to scan the same position, notwithstanding facet defects which would tend to cause the beam to scan above or below such position.

While the aforedescribed apparatus of Helmberger et al permits a relaxation of the manufacturing tolerances of the polygonal mirror, such apparatus tends to be relatively expensive, requiring factory calibration and a memory capability. Further, inasmuch as the Helmberger et al apparatus is an open loop system, the apparatus is not capable of compensating for dynamic changes in the scan line position, as may be occasioned, for instance, by changes in the ambient operating conditions or wear of the rotary mirror bearing.

SUMMARY OF THE INVENTION

In view of the foregoing, a primary object of the present invention is to provide a relatively simple, reliable and versatile apparatus which is adapted for use in an X-Y optical scanner for accurately controlling the position of a light beam which is repetitively scanned by a deflection device. According to the invention, an electrooptical feedback apparatus detects, prior to the formation of each horizontal scan line on the recording element, the vertical position at which such scan line will be formed, and in the event this position is displaced relative to a nominal position, produces an error signal proportional to the amount and direction of such displacement. This error signal is then used to effect a vertical movement of the scanning light beam prior to the formation of the scan line on the recording element, to a position at which it will scan the recording element in a nominal position. According to a preferred embodiment, an acoustooptic cell is used to position the light beam in response to the error signal, and a photoelectric circuit and a wedge-shaped aperture cooperate to produce the error signal. Such signal is applied to the acoustooptic cell to control the angle at which the cell diffracts the light beam and, hence, the angle at which such light beam impinges upon the deflection device. Preferably, one edge of the wedge-shaped aperture is arranged parallel to the direction of movement of the recording element. This edge of the aperture cooperates with the photoelectric circuit to initiate a predetermined time delay so that video information is applied to each scan line at precisely the same position on the horizontal scan line.

By detecting the scan line displacement at the start of each scan, the apparatus of the invention is capable of optimizing the scan line position regardless of the cause of any displacement. Thus, it is not subject to the disadvantages of the aforedescribed open loop systems which must rely on a precalibration procedure which cannot possibly compensate for all factors which might cause a displacement of the scan during the operation of the scanner.

Other advantages of the invention will become immediately apparent to those skilled in the art from the ensuing detailed description of a preferred embodiment, reference being made to the accompanying drawings.

DETAILED DESCRIPTION OF A PREFERRED EMBODIMENT

Figure 1:
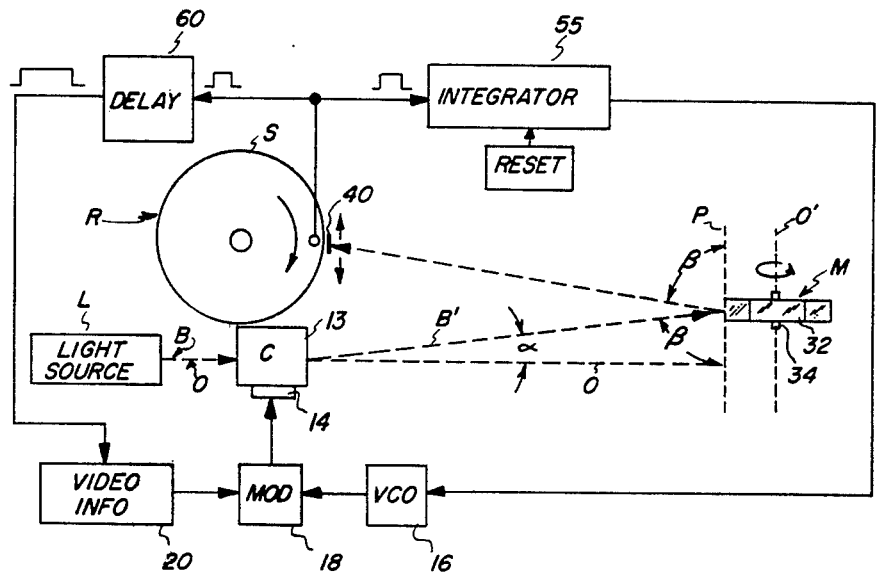
FIG. 1 is a schematic diagram showing the essential features of a preferred embodiment.

An optical scanner embodying the invention is schematically illustrated in FIG. 1. The scanner generally comprises (a) a light source L, such as a continuous-wave laser, for directing an intense light beam B along an optical path O; (b) an acoustooptic cell C for intensity-modulating beam B with video information to be recorded; and (c) a rotating polygonal mirror M for repetitively sweeping the intensity-modulated beam provided by the acoustooptic cell across the photosensitive surface S of a moving recording element R. The recording element may take any one of a variety of forms; however, for illustrative purposes, it is shown in the form of a rotatably mounted drum which is rotatably driven in the direction of the arrow. As used herein, the term "light" refers to electromagnetic radiation in the visible, ultraviolet and infrared portions of the electromagnetic spectrum.

Acoustooptic cell C is of conventional design and construction, comprising an acoustooptic medium 13 (e.g. glass, plastic, water, $PbMoO_4$, $LiNbO_3$) to which a piezoelectric transducer 14 is acoustically coupled. Transducer 14 is driven at an ultrasonic frequency by an oscillator 16 to cause acoustic waves to propagate through the cell. For reasons explained later herein, oscillator 16 is of the variable frequency type, such as a voltage-controlled oscillator (VCO), having an output frequency which is determined by a parameter (e.g. voltage level) of an input signal. A modulator 18 is operatively coupled to oscillator 16 to control the amplitude of the signal applied to the transducer and, hence, the acoustic power applied to the cell. Operation of modulator 18 is controlled by a source of video information 20.

For reasons well known and documented, acoustooptic cell C serves to diffract a major portion of the energy in light beam B at an angle $\alpha$ to produce a diffracted light beam B'. By varying the acoustic power applied to the cell, modulator 18 acts to modulate the intensity of diffracted light beam B' according to the video information being recorded. For a more thorough description of the constructions and operation of acoustooptic devices, reference is made to an article by I. C. Chang, entitled "Acoustooptic Devices and Applications," IEEE Transactions on Sonics and Ultrasonics, SU-23, 1 (1976). As far as the present invention is concerned, it suffices to note that the diffraction angle $\alpha$ is governed, in part, by the frequency of the ultrasonic wave within the cell which, of course, is determined by the frequency of the periodic signal provided by oscillator 16.

The polygonal mirror M is of conventional design, comprising a plurality of reflective facets 32 arranged around a central shaft 34 which is rotatably driven by a motor (not shown). Typically, shaft 34 is vertically arranged and is rotatably mounted in an air bearing to provide for high speed mirror rotation. For the purpose of illustration, the polygonal mirror is shown to comprise six facets (see FIG. 2). The polygonal mirror is positioned in such a manner that, as it rotates about vertical axis O', each facet sweeps the diffracted beam B' through an angle $\gamma$ to form a linear horizontal scan line H extending in the X direction) on surface S of the recording element (see FIG. 2). During the sweep of each facet, the recording element moves in the Y direction one vertical increment of the image being formed. Thus, as the individual mirror facets repetitively sweep the diffracted beam B' over the moving photosensitive surface an X-Y raster is formed on such surface. Video information is recorded by virtue of the fact that the diffracted beam B' is intensity-modulated during each sweep. Conventional means (not shown) are provided for synchronizing the rotational movement of the polygonal mirror with the movement of the recording element to provide the raster type pattern.

Figure 2:
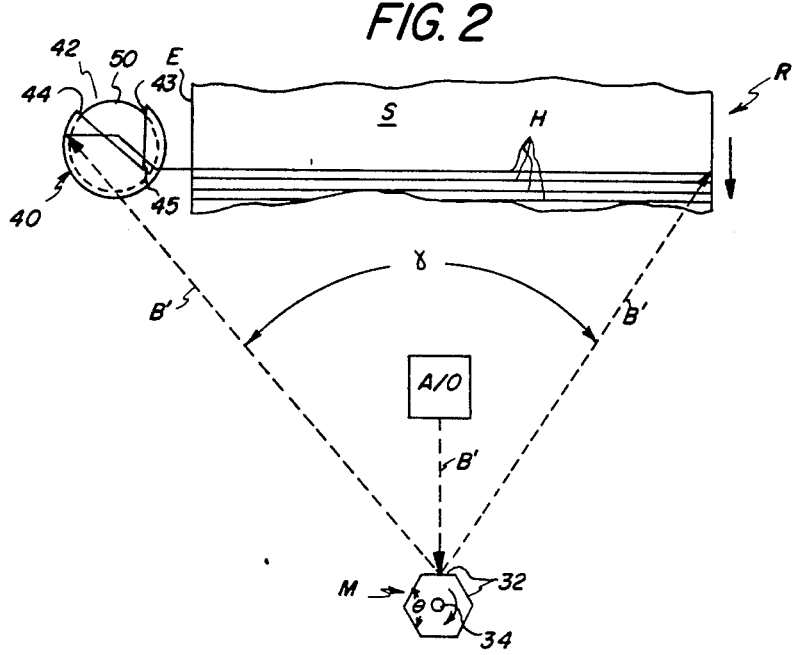
FIG. 2 illustrates a fragment upon which a light beam is optically scanned, together with a shaped mask for deriving scan line position information.

Referring to FIG. 2, it is desirable, of course, that each of the successively formed scan lines H be evenly spaced. Further, as each scan line is formed, it is desirable that the first bit of the encoded video information used to intensity-modulate the scan line be applied at the same point on the recording element surface, for example, at the edge E of the recording element. High quality imaging can only be obtained by satisfying these simple criteria. Unfortunately, as explained above, many factors (e.g. polygonal mirror defects, bearing run-out, changing atmospheric conditions, etc.) work against a simple solution to satisfying these criteria.

According to the present invention, apparatus is provided for maintaining the scan line spacing uniform, notwithstanding defects in the line scanning device, and other factors which would tend to produce uneven spacing. Further, apparatus is provided for assuring that the video information used to intensity-modulate each scan line is initially applied to the light beam at precisely the same point as it is swept across the recording element surface. Such apparatus is in the nature of a closed electrooptical feedback loop which, prior to the formation of each horizontal scan line on the recording element, senses the vertical position at which such scan line will be formed and, in the event this position differs from a nominal position, generates an error signal which, in the manner described hereinbelow, is used to shift the position of the scanning beam B' to a position to produce a scan line in the nominal position.

According to a preferred embodiment, the apparatus of the invention comprises a mask 40 having a wedge-shaped aperture 42 formed therein. Mask 40 is positioned in the plane of the recording element in close proximity to the edge E thereof so as to be within the sweep angle $\gamma$ of each mirror facet. Aperture 42 is defined by a pair of edges 43 and 44 which are angularly disposed and intersect at vertex 45. The mask is arranged so that one edge extends in a direction parallel to edge E of the recording element. Preferably, it is positioned such that the nominal position of the horizontal scan line H intersects edge 43 at vertex 45.

Arranged behind mask 40 in a position to be illuminated by the scanned beam as it is swept across the wedge-shaped aperture of the mask is a photocell 50, such as a PIN diode. During each scan, the photocell is illuminated by the scanned beam, the duration of this illumination being dependent upon the vertical position (as viewed in FIG. 2) of the scan line. Referring to FIG. 2, as the scanning light beam moves toward the vertex 45 of the mask, the duration of photocell illumination becomes relatively short. On the other hand, as the vertical position of the scan line moves upwardly, away from the vertex of the mask, the duration of photocell illumination increases. Thus, it may be appreciated that, as the beam B' is swept across the mask, the output of the photocell will be in the form of a rectangular pulse, the pulse width being determined by the vertical position of the scan line being formed. While the start of each pulse will vary with the vertical position of the scan line, the end of each pulse will be determined by the edge 43.

Referring again to FIG. 1, the rectangular pulse produced by the combination of mask 40 and photocell 50 is fed to both an integrator circuit 55 and a delay circuit 60. The output voltage of integrator 55 is, of course, dependent upon the pulse width of the input signal. The output voltage of the integrator, being proportional to the vertical position of the horizontal scan lines, is used to control the output frequency of the variable frequency oscillator 16 which, according to the preferred embodiment, takes the form of a conventional voltage-controlled oscillator. As previously mentioned, varying the frequency of the acoustic wave traveling in the acoustooptic cell causes the diffraction angle $\alpha$ to vary. As is apparent in FIG. 1, varying the diffraction angle $\alpha$ causes a corresponding change in the angle of incidence $\beta$ between the diffracted beam B' and the plane P of each mirror facet. As the angle of incidence $\beta$ varies, the vertical displacement of the horizontal scan line on the recording element will vary. Thus, a closed-loop system is provided for adjusting the position of the scanning light beam prior to the formation of each scan line.

As indicated above, the optimum horizontal scan line position is one which intersects the vertical edge 43 of the mask at vertex 45. When the to-be-formed scan line occupies this position, the width of the pulse produced by the photocell is zero, as is the output of the integrator, thereby allowing the variable frequency oscillator to oscillate at a nominal frequency. An upward displacement of the scan line from the optimum position will cause a broadening of the pulse provided by the photocell and, hence, an increase in the output voltage of the integrator. This, in turn, will act to decrease the frequency of oscillator 16, thereby causing the diffraction angle to become smaller. As the diffraction angle $\alpha$ decreases, the angle of incidence $\beta$ between the diffracted beam B' and the mirror facet 32 will increase, thereby causing the beam position to move downwardly toward the nominal position. In operation, the integrator output will cause the beam position to move toward the nominal position, while the light beam traverses the mask. Such movement is shown in FIG. 2. The minimum value of the integrator gain which will give a complete correction of the beam position is that which causes the beam to follow a path substantially parallel to the sloping edge 44 of the mask. If the integrator gain is higher than this minimum value, the beam may be temporarily driven to a position below mask edge 44, thereby interrupting the correction process. Since the integrator output remains constant until the beam re-enters the mask aperture, this interruption will have no effect on the correction process. Thus, it may be appreciated that for each sweep of the beam, the output of the photocell may be in the nature of a single pulse or a train of pulses. Nevertheless, the action of the integrator is to cause the beam to exit the mast at its vertex.

In addition to providing information on the vertical position of the scan line, the output signal from the photocell is also used to provide timing information. Since edge 43 occupies a fixed position relative to edge E of the recording element, the trailing edge of the rectangular pulse provided by the photocell can be used to trigger a delay circuit 60, such as a conventional one-short multivibrator, which generates a timing pulse corresponding to the time it takes for the beam to travel from edge 43 to edge E of the recording element. The end of this timing pulse is used to initiate the application of video information to modulator 18.

It should be noted that the scan line-positioning apparatus described above, being a closed loop system, does not suffer the aforementioned drawbacks associated with prior art techniques. Unlike such techniques, the correction signals used to control the scan line position are not determined by a pre-use calibration and a resulting programmed correction. Rather, the scan line position is determined prior to the formation of each scan line, and if necessary, a correction of the scan line position is made just prior to the formation generated on an as-needed basis.

The invention has been described in detail with particular reference to preferred embodiments thereof but it will be understood that variations and modifications can be effected within the spirit and scope of the invention.

What is claimed is:

1. In an optical scanner of the type which includes scanning means for repetitively scanning a light beam to produce, during a portion of each beam scan, a linear scan line on a photosensitive surface, and photoelectric means for minimizing the displacement of such linear scan line from a nominal position, the improvement wherein said photoelectric means comprises:
    (a) a photocell positioned to be temporarily illuminated by a light beam scanned by said scanning means prior to the production of each linear scan line, said photocell being adapted to produce a first electrical signal when illuminated;
    (b) an optical mask having a wedge-shaped aperture formed therein for controlling the time period during which said photocell is illuminated by a scanned beam in accordance with the amount by which a scan line, when produced by said scanned beam, would be displaced from said nominal position;
    (c) circuit means operatively coupled to said photocell and responsive to said first signal for producing a second signal having an amplitude which increases during the time period said photocell is illuminated by a scanned beam; and
    (d) means operatively coupled to said circuit means and responsive to the amplitude of said second signal for adjusting the position of said scanned beam, while said scanned beam illuminates said photocell, to cause a scan line, upon being produced by said scanned beam, to substantially coincide with said nominal position.

2. The apparatus as defined in claim 1 wherein said scanning means comprises a multifaceted rotating mirror positioned in the light beam, and said beam adjusting means comprises acoustooptic means responsive to said second signal for varying the angle of incidence between said light beam and the individual facets of said moving mirror.

3. The apparatus as defined in claim 2 wherein said acoustooptic means comprises an acoustooptic deflector which is responsive to a periodic signal to deflect an incident light beam at an angle determined by the frequency of such periodic signal, and a voltage controlled oscillator operatively coupled to said acoustooptic deflector and said circuit means for producing a periodic signal having a frequency determined by the amplitude of said second signal.

4. The apparatus as defined in claim 1 wherein said circuit means comprises an integrator circuit.

5. In an optical scanner of the type which includes scanning means for repetitively scanning a light beam to produce, during a portion of each beam scan, a linear scan line on a photosensitive surface, such scanning means comprising a multifaceted rotating mirror, each facet of which is moved into position to reflect an incident light beam toward said photosensitive surface during rotation of the mirror, and beam control means for varying the angle of incidence between a light beam and the facets of such multifaceted rotating mirror to minimize the displacement of each scan line from a nominal position, the improvement wherein said beam control means comprises:

(a) a photocell positioned to be illuminated by a scanned light beam prior to the production of a scan line on said photosensitive surface;

(b) a mask having a wedge-shaped aperture formed therein, the apex of said aperture being positioned substantially in the plane of said nominal position, whereby said mask is effective to prevent a scanned beam from illuminating said photocell in the event the scan line produced by a scanned beam substantially coincides with said nominal position, and to increase the time period during which said photocell is illuminated by said scanned beam as the displacement between said scan line and said nominal position increases;

(c) an integrator circuit operatively coupled to said photocell for producing an output signal having an amplitude which increases as the period of photocell illumination increases; and (d) acoustooptic means responsive to said output signal for varying, during the presence of said output signal, the angle of incidence between said light beam and mirror facet to cause said beam to produce, when scanned by said scanning means, a scan line which substantially coincides with said nominal position.

6. The apparatus according to claim 5 wherein said acoustooptic means comprises (a) an acoustooptic deflector which is responsive to a periodic signal to deflect an incident light beam at an angle determined by the frequency of such periodic signal, and (b) variable frequency means operatively coupled to said acoustooptic deflector for producing a periodic signal having a frequency determined by the amplitude of said output signal.

* * * * *